(12) United States Patent
McNeely et al.

(10) Patent No.: US 9,519,294 B2
(45) Date of Patent: Dec. 13, 2016

(54) LOW PRESSURE PILOT OPERATED RELIEF VALVE

(71) Applicant: Pentair Flow Services AG, Schaffhausen (CH)

(72) Inventors: Michael McNeely, Stafford, TX (US); Michael Marcellus, Stafford, TX (US); Stephen Simpson, Stafford, TX (US)

(73) Assignee: Pentair Flow Services AG, Schaffhausen (CH)

( * ) Notice: Subject to any disclaimer, the term of this patent is extended or adjusted under 35 U.S.C. 154(b) by 197 days.

(21) Appl. No.: 14/600,943

(22) Filed: Jan. 20, 2015

(65) Prior Publication Data
US 2015/0205307 A1   Jul. 23, 2015

Related U.S. Application Data

(60) Provisional application No. 61/928,850, filed on Jan. 17, 2014.

(51) Int. Cl.
| | |
|---|---|
| *F16K 17/02* | (2006.01) |
| *G05D 16/16* | (2006.01) |
| *F16K 31/126* | (2006.01) |
| *F16K 1/06* | (2006.01) |
| *F16K 27/02* | (2006.01) |

(52) U.S. Cl.
CPC ............. *G05D 16/16* (2013.01); *F16K 1/06* (2013.01); *F16K 17/02* (2013.01); *F16K 27/02* (2013.01); *F16K 31/1266* (2013.01); *Y10T 137/7764* (2015.04)

(58) Field of Classification Search
CPC ............. G05D 16/16; F16K 1/06; F16K 27/02; F16K 31/1266; F16K 17/02; F16K 27/0209; Y10T 137/7764
USPC ................................. 251/366; 137/488–489
See application file for complete search history.

(56) References Cited

U.S. PATENT DOCUMENTS

| | | | |
|---|---|---|---|
| 2,316,649 A | 4/1943 | Jurs | |
| 2,342,472 A * | 2/1944 | Jurs, Jr. ................. | F16K 17/105 137/484.2 |
| 2,570,432 A | 10/1951 | Dillon | |
| 2,576,516 A | 11/1951 | Jurs | |
| 2,785,861 A | 3/1957 | Kimm et al. | |
| 2,792,015 A | 5/1957 | Smith | |
| 2,810,527 A | 10/1957 | Work | |
| 2,815,040 A | 12/1957 | Smith | |
| 3,294,111 A | 12/1966 | Abercrombie et al. | |
| 3,386,469 A | 6/1968 | Kelly | |
| 3,477,456 A | 11/1969 | Powell | |
| 3,592,224 A | 7/1971 | Bois | |
| 3,794,062 A | 2/1974 | AuWerter | |

(Continued)

*Primary Examiner* — John Bastianelli
(74) *Attorney, Agent, or Firm* — Quarles & Brady LLP

(57) ABSTRACT

Embodiments of the invention provide a relief valve body arranged for connecting to a pressure vessel. The relief valve body includes an inlet configured to connect to a pressure vessel and an integrated nozzle downstream from the inlet and extending along an axis. The integrated nozzle includes a nozzle exterior surface, a nozzle bulb, and a valve seat and defines a nozzle expansion region. The relief valve body further includes a redirecting pallet, a valve interior surface having at least one ramped portion downstream from the integrated nozzle and redirecting pallet, and an outlet downstream from the at least one ramped portion.

9 Claims, 4 Drawing Sheets

(56) References Cited

U.S. PATENT DOCUMENTS

| | | | |
|---|---|---|---|
| 3,881,505 A | | 5/1975 | Dunkelis |
| 4,091,837 A | | 5/1978 | Edmunds et al. |
| 4,172,466 A | | 10/1979 | Pattarini et al. |
| 4,312,375 A | | 1/1982 | Leinemann |
| 4,316,598 A | * | 2/1982 | Maggio ................. F16K 17/105 137/492 |
| 4,462,420 A | | 7/1984 | Cullie |
| 4,515,179 A | | 5/1985 | Edmunds et al. |
| 5,048,751 A | | 9/1991 | DuBois |
| 5,167,253 A | | 12/1992 | Fournier et al. |
| 5,511,581 A | * | 4/1996 | Ligh ....................... F16K 17/10 137/489 |
| 5,555,910 A | | 9/1996 | Powell et al. |
| 5,913,330 A | | 6/1999 | Jones et al. |
| 5,924,673 A | | 7/1999 | Welker |
| 5,967,165 A | | 10/1999 | Alberts |
| 5,992,449 A | | 11/1999 | Sprague |
| 6,553,979 B2 | | 4/2003 | Albright |
| 7,997,556 B2 | | 8/2011 | Migliorati |
| 2008/0142091 A1 | * | 6/2008 | Meinig .................... F16K 7/17 137/488 |
| 2012/0205564 A1 | * | 8/2012 | Klein ..................... F16K 15/06 251/15 |
| 2013/0213497 A1 | | 8/2013 | Helmsen et al. |

* cited by examiner

LOW PRESSURE PILOT OPERATED RELIEF VALVE

RELATED APPLICATION

This application claims the benefit of U.S. Provisional Application No. 61/928,850 filed on Jan. 17, 2014, the entire disclosure of which is hereby incorporated herein by reference.

BACKGROUND

The present disclosure relates generally to relief valves for pressure vessels and, in particular, to pilot operated relief valves.

Current manufacturers commonly employ valve body designs intended to direct a fluid flow at a right angle with respect to an inlet without consideration to an expansion of the traversing fluid. Additionally, such designs typically do not provide means for controlling the expansion of the traversing fluid, and commonly rely solely on a cylindrical curtain area to allow the traversing fluid to pass into the valve body. Such valves deliver inferior flow rate efficiency through the valve body and, therefore, it would be desirable to have a valve body that provides a means to control the expansion of the traversing fluid through the valve body.

BRIEF SUMMARY OF THE INVENTION

The aforementioned shortcomings can be overcome by providing a relief valve body that includes features configured for increased efficiency of fluid flowing through the valve. Additionally, an interior shape of the inventive relief valve body allows for controlled expansion of the fluid and the management of the fluid energy in assisting in the change of direction of fluid flow. Such features may also provide advantages to applications employing any system, device, or structure wherein a fluid flow direction is changed in a controllable manner between an inlet and an outlet.

In one aspect, the invention provides a relief valve body arranged for connecting to a pressure vessel. The relief valve body includes an inlet configured to connect to a pressure vessel and an integrated nozzle downstream from the inlet and extending along an axis. The integrated nozzle includes a nozzle exterior surface, a nozzle bulb, and a valve seat and defines a nozzle expansion region. The relief valve body further includes a redirecting pallet, a valve interior surface having at least one ramped portion downstream from the integrated nozzle and redirecting pallet, and an outlet downstream from the at least one ramped portion.

In another aspect, the invention provides a relief valve body arranged between an inlet and an outlet. The relief valve body includes an expanding nozzle extending along an axis, a first ramp extending in an arcuate path from an apex to a first terminating point, and a second ramp extending in an arcuate path from the apex to a second terminal point. The first ramp and the second ramp define an expanding flow area for a fluid flow between the inlet and the outlet.

In another aspect, the invention provides a relief valve body arranged for connecting to a pressure vessel. The relief valve body includes an inlet for connecting to a pressure vessel and an integrated nozzle downstream from the inlet and extending along an axis. The integrated nozzle defines a nozzle expansion region and includes a nozzle exterior surface, a nozzle bulb defining a substantially protrudent shape that protrudes away from the axis, and a valve seat. The relief valve body further includes a valve interior surface having a first ramped portion, a second ramped portion, a flat portion, and an arced portion. The first ramped portion expands a fluid flow area by ramping from a ramp apex around the integrated nozzle to the flat portion. The second ramped portion expands the fluid flow area by ramping from the ramp apex around the integrated nozzle to the flat portion on an opposite side of the integrated nozzle from the first ramped portion. The relief valve body further includes a redirecting pallet defining a curved portion and a flat portion that cooperate to direct a fluid flow towards the valve interior surface and an outlet downstream from the first ramped portion and the second ramped portion.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Figure 1:
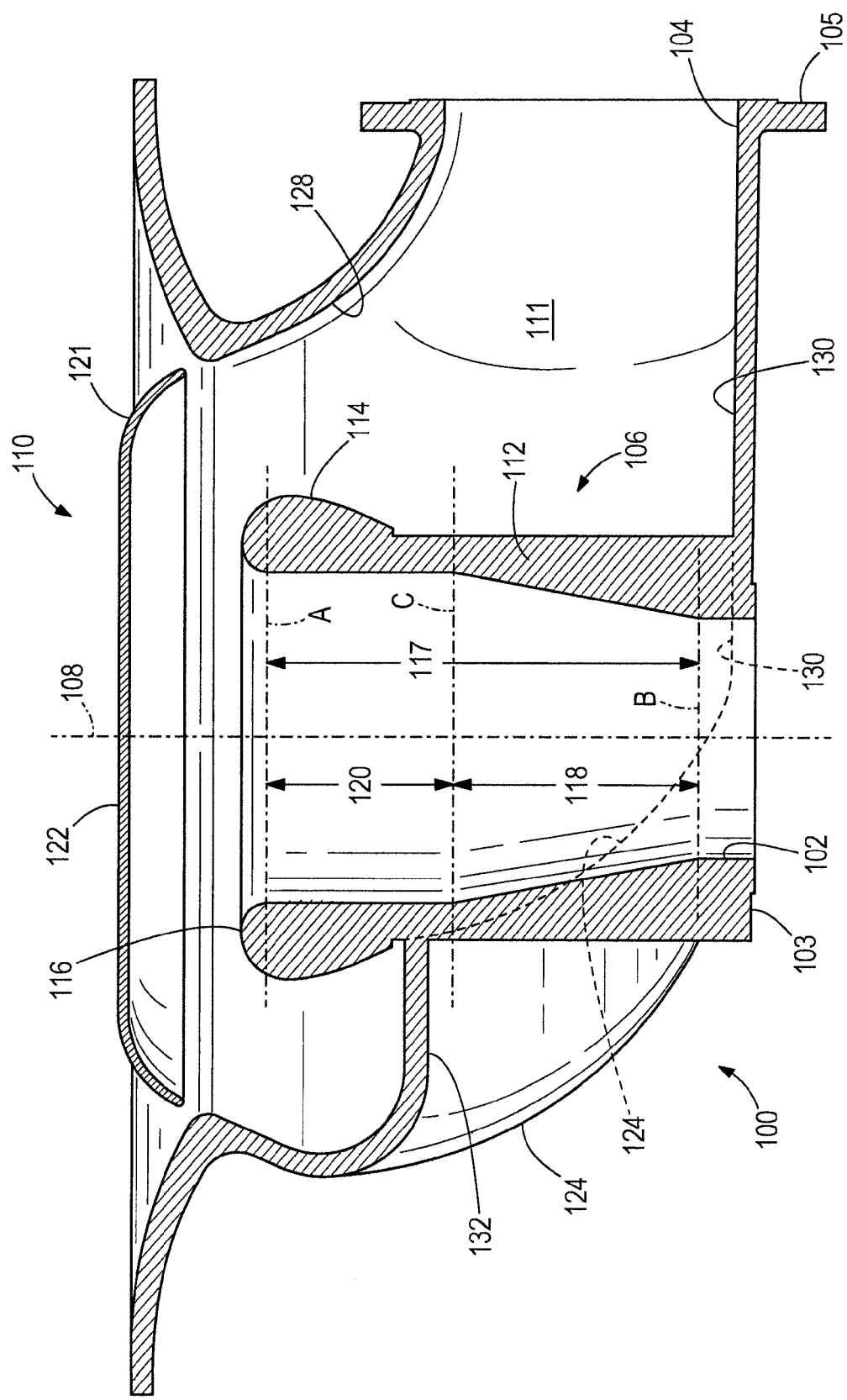
FIG. 1 is a cross-sectional side view of a relief valve body in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The present invention introduces a relief valve body 100 designed for use in any applications employing systems or components designed for maintaining fluid flows, such as, for example, systems, vessels or tankers used for processing, transporting or storing liquefied natural gas (LNG). Features of the relief valve body 100 in accordance with the present invention will be readily apparent and are generally indicated in FIGS. 1-4.

As shown in FIG. 1, the relief valve body 100 is configured to controllably divert a fluid flow between an inlet 102 and an outlet 104. The inlet 102 is arranged at an angle of approximately 90 degrees with respect to the outlet 104. In other embodiments, the inlet 102 may be arranged at a different angle with respect to the outlet 104, as desired. The inlet 102 and the outlet 104 of the relief valve body 100 can be designed with capabilities and/or components for coupling to a fluid-bearing vessel, device, or system. In the illustrated embodiment, the inlet 102 includes an inlet mounting feature 103 in the form of a flange and the outlet 104 includes an outlet mounting feature 105 in the form of a flange. In other embodiments, the inlet mounting feature 103 and/or the outlet mounting feature 105 may be in the form of a threaded pipe fitting or be arranged differently, as desired.

The relief valve body 100 includes an integrated nozzle 106 downstream from the inlet 102 and extending along an axis 108, a redirecting pallet 110, and a valve interior surface 111 arranged downstream from the integrated nozzle 106 and the redirecting pallet 110. The integrated nozzle 106 includes a nozzle exterior surface 112, a nozzle bulb 114, and a valve seat 116 configured to couple to a valve element (not shown) of a pressure relief valve system. The integrated nozzle 106 defines a nozzle expansion region 117 generally bounded between plane A and plane B and indicated as element 117. The nozzle expansion region can be shaped and dimensioned to enable a controlled expansion of the fluid flow from the inlet 102 and through the integrated nozzle 106 generally along the axis 108. In the illustrated embodiment, the nozzle expansion region 117 includes a tapered portion generally bounded between plane B and plane C and indicated as element 118 that defines a substantially frusto-conical, or sloped shape and a nozzle exit portion 120, downstream from the tapered portion 118, generally bounded between plane A and plane C and indicated by element 120.

The expansion of the fluid flow traversing the nozzle expansion region 117 of the integrated nozzle 106 may be controlled by an expansion ratio $R_{exp}$ defined by the tapered portion 118. In the illustrated embodiment, the expansion ratio $R_{exp}$ of the tapered portion 118 is approximately 1.8. In other embodiments, the tapered portion 118 can define a different expansion ratio $R_{exp}$, as desired. For example, the expansion ratio $R_{exp}$ may be between about 1.7 and 1.9, or in other embodiments, the expansion ratio $R_{exp}$ may be between about 1.5 and 2.1. The shape of the integrated nozzle 106 allows for better control of expansion and a standing shock wave of a fluid. As such, the relief valve body 100 may be suitable for high pressure flow conditions.

The nozzle exterior surface 112 defines a generally cylindrical shape and is configured to be downstream from the nozzle bulb 114. The nozzle bulb 114 defines a substantially arced, or protrudent shape that is configured to control a standing shock wave of the fluid flow as the fluid flow is being directed towards the valve interior surface 111. The protrudent shape of the nozzle bulb 114 protrudes away from the axis 108.

With continued reference to FIG. 1, the redirecting pallet 110 is configured to receive the fluid flow generally directed along the axis 108 from the inlet 102, and divert the fluid flow in directions generally away from the axis 108 and towards the valve interior surface 111. The redirecting pallet 110 can be designed to be substantially circular, although other shapes are possible. The redirecting pallet 110 defines a curved portion 121 and a flat portion 122 that cooperate to direct the fluid flow and develop a more laminar flow profile.

The shape of the redirecting pallet 110, the nozzle bulb 114, and the nozzle expansion region 117 are designed to cooperate and allow for control of the fluid flow as it flows through and away from the integrated nozzle 106. For example, for higher pressure applications, the nozzle bulb 114 of the integrated nozzle 106 may be shaped to be more bulbous, or protrude further from the axis 108 than shown in FIG. 1, which would allow for a standing shock of the fluid flow to occur prior to entering the valve interior surface 111. In contrast, for lower pressure applications, the nozzle bulb 114 of the integrated nozzle 106 may be shaped to be less bulbous, or protrude less from the axis 108 than shown in FIG. 1, which may allow for a more free fluid expansion into the valve interior surface 111.

Figure 2:
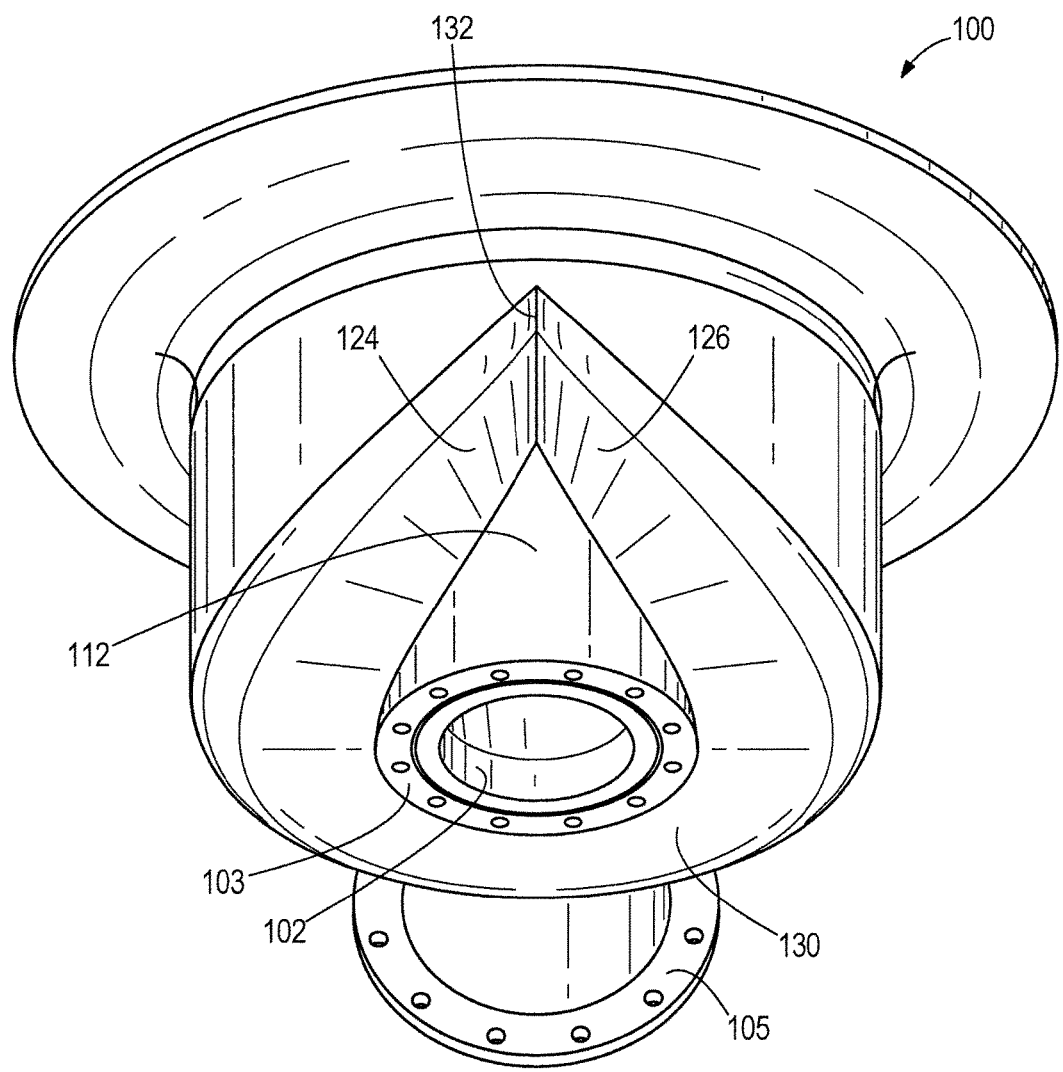
FIG. 2 is a perspective, bottom view of the relief valve body of FIG. 1.
Figure 3:
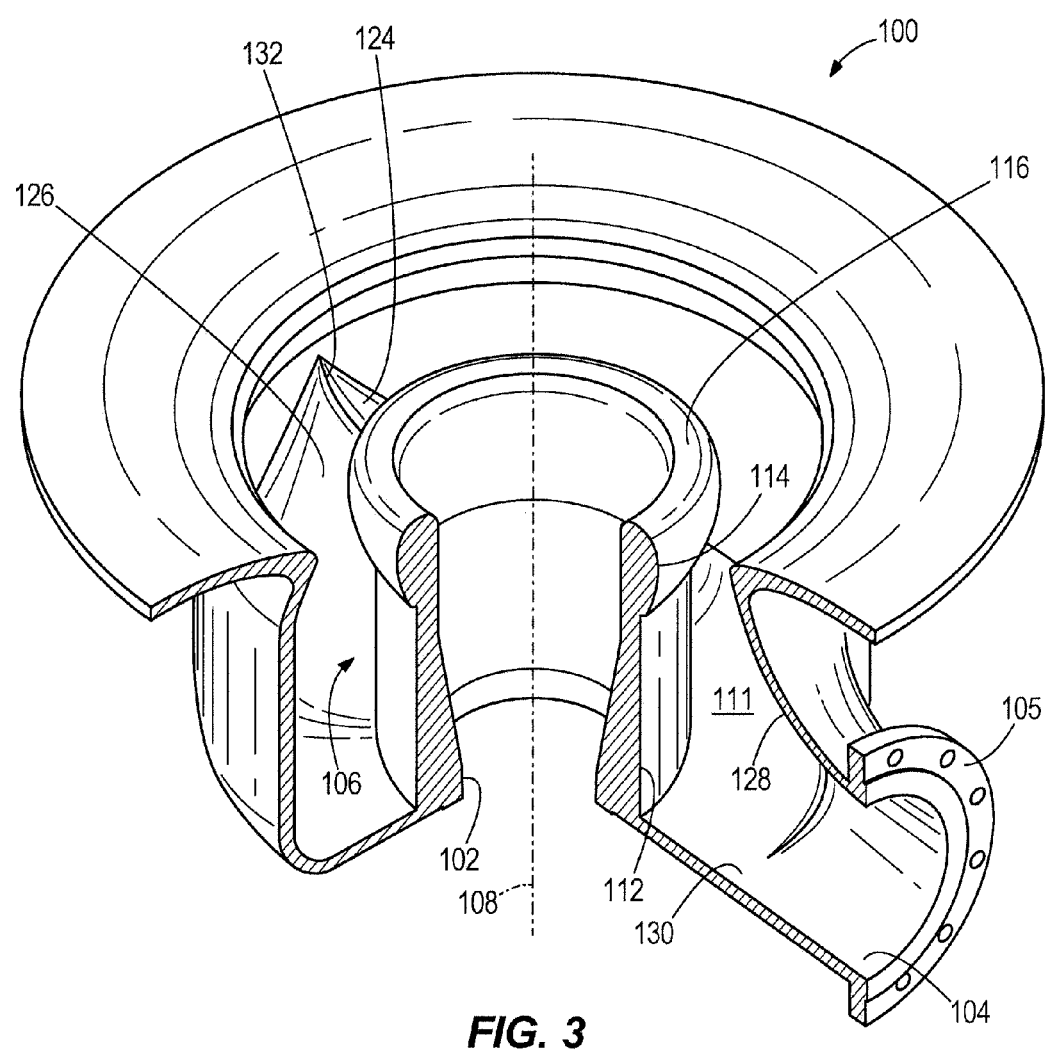
FIG. 3 is a perspective, top view of the relief valve body of FIG. 1 with a quarter cutout and the redirecting pallet removed.

With reference to FIGS. 1-3, the valve interior surface 111 includes a first ramped portion 124, a second ramped portion 126, an arced portion 128, and a flat portion 130. The first ramped portion 124 begins at a ramp apex 132 and expands a fluid flow area for the fluid flow traveling along the first ramped portion 124 by ramping towards the outlet 104 and around the integrated nozzle 106. The fluid flow area continues expanding until the first ramped portion 124 engages the flat portion 130, as shown in FIG. 1 by the dashed lines illustrating the first ramped portion 124 and the flat portion 130. The second ramped portion 126 begins at the ramp apex 132 and expands a fluid flow area for the fluid flow traveling along the second ramped portion 126 by ramping towards the outlet 104 and around the integrated nozzle 106, in an opposite direction from the first ramped portion 124. The fluid flow area continues expanding until the second ramped portion 126 engages the flat portion 130. In the illustrated embodiment, the first ramped portion 124 and the second ramped portion 126 engage the flat portion 130 in a plane closer to the outlet 104 than the axis 108. In other embodiments, the first ramped portion 124 and the second ramped portion 126 may engage the flat portion 130 in a plane substantially further away, substantially closer to the outlet 104 than the axis 108, or in a plane intersecting the axis 108.

The arced portion 128 defines a gradually decreasing flow area for the fluid flow traveling towards the outlet 104 of the valve body 100. The gradual decrease in fluid flow area provides a reduced pressure drop between the inlet 102 and the outlet 104 of the valve body 100.

The expanded flow area provided by the first ramped portion 124 and the second ramped portion 126 provide a reduction in a velocity of the fluid flow traversing from the inlet 102 to the outlet 104 of the relief valve body 100. This reduction in flow velocity aids in reducing a pressure drop between the inlet 102 and the 104. Additionally, the reduced velocity of the fluid flow reduces the Reynolds number of the fluid flow and, therefore, reduces the chance of fluid separation, or turbulence, occurring downstream from the integrated nozzle 106. Thus, the first ramped portion 124, the second ramped portion 126, the arced portion 128, and the flat surface 130 enable a superior flow rate efficiency and retain a total pressure of the fluid flow by minimizing a pressure drop between the inlet 102 and the outlet 104 of the valve body 100.

Figure 4:
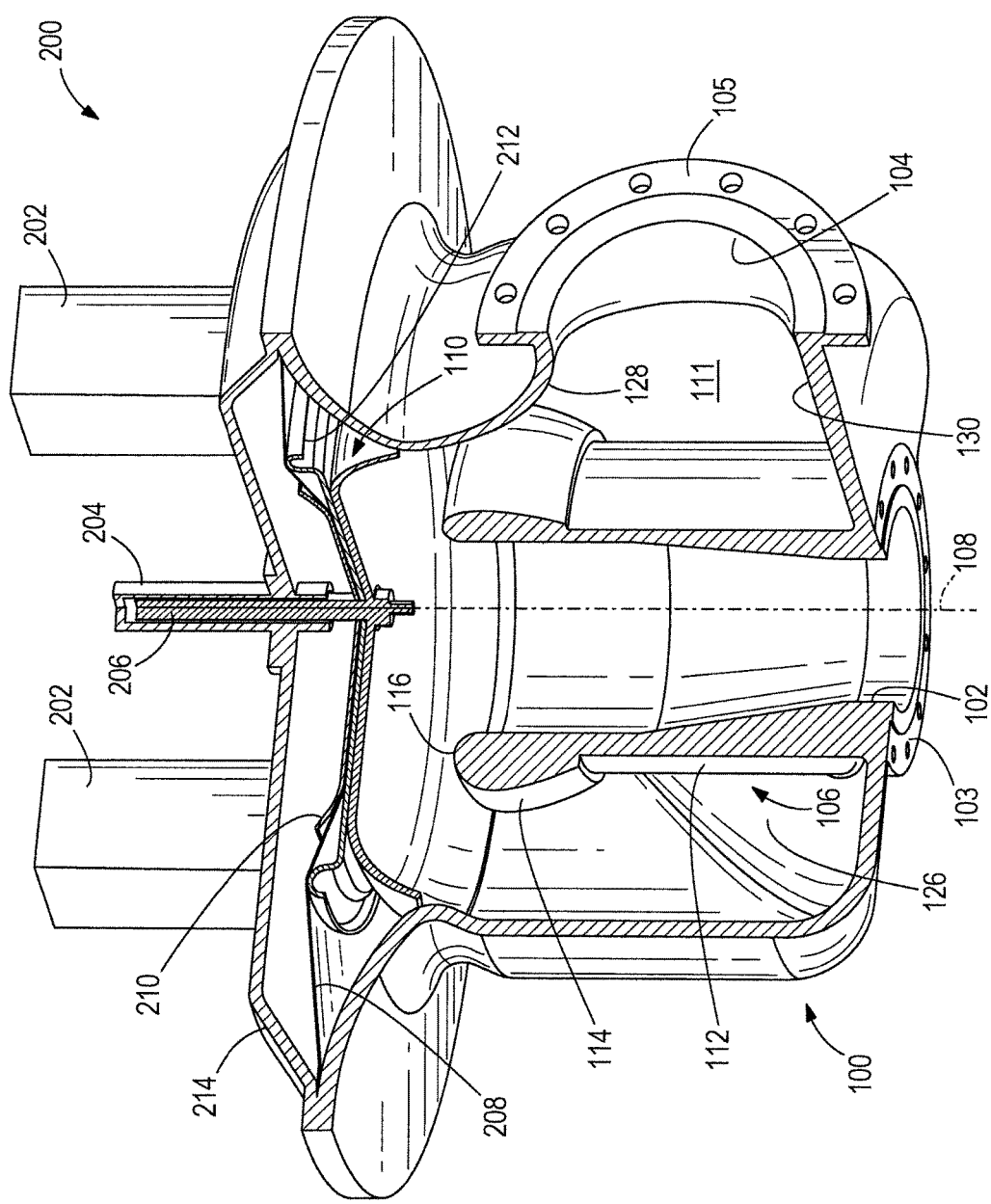
FIG. 4 is a perspective, bottom view of an example relief valve with a quarter cutout.

FIG. 4 illustrates a use for the relief valve body 100 described above. The relief valve body 100 may be integrated into a pilot operated relief valve 200, which as known in the art, is used to provide gradual, proportional or pre-set pressure relief. The pilot operated relief valve 200 shown in FIG. 4 includes pilot valves 202, a guide 204, a guide pin 206, and a diaphragm 208 adjacent to the redirecting pallet 110. An upper blousing plate 210 and a lower blousing plate 212 are located adjacent to the diaphragm 208. The pilot valves 202 are mounted on a cover 214 that is coupled to the valve body 100 and encloses the valve interior surface 111 and the diaphragm 208.

Although not shown, the pilot operated relief valve 200 also includes a valve element removably coupled to the valve seat 116 of the integrated nozzle 106. The valve element is typically formed from a flexible material and can be attached to a bottom surface of the redirecting pallet 110. The valve element may include a valve element cover that can be formed from a polytetrafluoroethylene (PTFE) material, which lays over the valve element, serving as a protective layer.

Operation of the pilot operated relief valve 200 including the relief valve body 100 will be described with reference to FIG. 4. The valve element (not shown for clarity in describing the features of the relief valve body 100) is typically biased towards a first position where fluid flow is prevented from the inlet 102 to the outlet 104 of the relief valve body 100. Once a predetermined pressure is detected by the pilot valves 202, the valve element is allowed to move from the first position to a second position where fluid flow is allowed between the inlet 102 and the outlet 104 of the relief valve body 100. The fluid flow traveling from the inlet 102 to the outlet 104 is first expanded in the nozzle expansion region 117 downstream from the inlet 102. The fluid flow then exits the integrated nozzle 106 through the nozzle exit region 120 and is directed towards the valve interior surface 111 by the redirecting pallet 110. The first ramped portion 124 and the second ramped portion 126 then expand the fluid flow and direct the fluid flow towards the outlet 104 in an efficient manner.

The design of a relief valve body 100, in accordance with the present invention, is focused on delivering superior flow rate efficiency through the valve interior surface 111 of the valve body 100, for example, in the case of subsonic fluid flow. The expansion characteristics of the fluid flow are tightly controlled through geometrical configurations of the integrated nozzle 106 features, the redirecting pallet 110 shape, and the design of the portions 124, 126, 128, and 130 of the interior valve surface 111. The controlled expansion of a gas, for example, minimizes losses and retains a total pressure as much as possible until the outlet 104 of the valve body 100.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A relief valve arranged for connecting to a pressure vessel, the relief valve body comprising:
    an inlet configured to connect to a pressure vessel;
    an integrated nozzle downstream from the inlet and extending along an axis, the integrated nozzle defining a nozzle expansion region and including a nozzle exterior surface, a nozzle bulb defining a substantially protrudent shape that protrudes away from the axis, and a valve seat;
    a valve interior surface including a first ramped portion, a second ramped portion, a flat portion, and an arced portion, the first ramped portion expanding a fluid flow area by ramping from a ramp apex around the integrated nozzle to the flat portion and the second ramped portion expanding the fluid flow area by ramping from the ramp apex around the integrated nozzle to the flat portion on an opposite side of the integrated nozzle from the first ramped portion;
    a redirecting pallet defining a curved portion and a flat portion that cooperate to direct a fluid flow towards the valve interior surface; and
    an outlet downstream from the first ramped portion and the second ramped portion.

2. The relief valve body of claim 1, wherein the nozzle expansion region defines an expansion ratio $R_{exp}$ of approximately 1.8.

3. The relief valve body of claim 1, wherein the nozzle expansion region defines an expansion ratio $R_{exp}$ of between about 1.5 and about 2.1.

4. The relief valve body of claim 1, wherein the nozzle expansion region defines a substantially frusto-conical shape.

5. The relief valve body of claim 1, wherein the redirecting pallet defines a curved portion and a flat portion that cooperate to direct a fluid flow towards the valve interior surface.

6. The relief valve body of claim 1, wherein the first ramped portion and the second ramped portion engage the flat portion in a plane between the outlet and the axis.

7. The relief valve body of claim 1, wherein the first ramped portion and the second ramped portion engage the flat portion in a plane intersecting the axis.

8. The relief valve body of claim 1, wherein the first ramped portion and the second ramped portion engage the flat portion in a plane substantially further away from the outlet than the axis.

9. The relief valve body of claim 1, wherein the arced portion defines a decreasing flow area for a fluid flow traveling towards the outlet.

\* \* \* \* \*